US010955518B2

(12) United States Patent
Lindquist et al.

(10) Patent No.: US 10,955,518 B2
(45) Date of Patent: Mar. 23, 2021

(54) METHOD FOR GENERATING AN INDOOR ENVIRONMENT MODEL AND A METHOD FOR DETERMINING POSITION DATA FOR A LOCATION IN AN INDOOR ENVIRONMENT

(71) Applicant: Combain Mobile AB, Lund (SE)

(72) Inventors: Björn Lindquist, San Jose, CA (US);
Anders Mannesson, Hjärup (SE); Karl Åström, Lund (SE)

(73) Assignee: Combain Mobile AB, Lund (SE)

(*) Notice: Subject to any disclaimer, the term of this patent is extended or adjusted under 35 U.S.C. 154(b) by 0 days.

(21) Appl. No.: 16/470,090

(22) PCT Filed: Jan. 11, 2018

(86) PCT No.: PCT/EP2018/050642
§ 371 (c)(1),
(2) Date: Jun. 14, 2019

(87) PCT Pub. No.: WO2018/130609
PCT Pub. Date: Jul. 19, 2018

(65) Prior Publication Data
US 2020/0018812 A1    Jan. 16, 2020

(30) Foreign Application Priority Data

Jan. 16, 2017  (EP) .................................. 17151637

(51) Int. Cl.
*H04W 24/00*      (2009.01)
*G01S 5/00*       (2006.01)
(Continued)

(52) U.S. Cl.
CPC .......... *G01S 5/0027* (2013.01); *G01C 21/206* (2013.01); *G01S 5/0226* (2013.01);
(Continued)

(58) Field of Classification Search
CPC .... G01S 5/0027; G01S 5/0226; G01S 5/0278; G01C 21/206; H04W 4/029; H04W 4/33;
(Continued)

(56) References Cited

U.S. PATENT DOCUMENTS 9,008,685 B1    4/2015  Gold et al.
9,395,190 B1    7/2016  Young et al.
(Continued)

FOREIGN PATENT DOCUMENTS

EP    3093683        * 11/2016  ............... G01S 5/02
WO    WO 2012/107268 A1   8/2012
WO    WO 2015/065857      7/2015

OTHER PUBLICATIONS

International Search Report and Written Opinion for PCT/EP2018/050642, dated Jun. 13, 2018 (in 17 pages).

*Primary Examiner* — Dai Phuong
(74) *Attorney, Agent, or Firm* — Knobbe Martens Olson & Bear, LLP

(57) ABSTRACT

A method for generating an indoor environment model of a building. The method comprises forming a transmitter location model for defining positions of transmitters in said building using gathered information for establishing transmitter locations. The method further comprises receiving signal strength indicative measurements determined for a number of transmitters using at least one electronic communications device wherein the signal strength indicative measurements are based on a signal which has varying signal propagation characteristics in the indoor environment The signal strength indicative measurements are acquired from a number of known locations in the building, identifying discrepancies of signal transmittance in said indoor environment based on said signal strength indicative measurements in relation to said transmitter location model. The method further comprises determining locations of signal (Continued)

hindering elements causing said discrepancies and generating said indoor environment model including transmitter locations and said signal hindering elements.

10 Claims, 6 Drawing Sheets

(51) Int. Cl.
| | |
|---|---|
| *H04B 17/318* | (2015.01) |
| *H04W 4/33* | (2018.01) |
| *H04W 4/029* | (2018.01) |
| *G01C 21/20* | (2006.01) |
| *G01S 5/02* | (2010.01) |
| *H04W 4/02* | (2018.01) |
| *H04W 64/00* | (2009.01) |

(52) U.S. Cl.
CPC .......... *G01S 5/0278* (2013.01); *H04B 17/318* (2015.01); *H04W 4/023* (2013.01); *H04W 4/029* (2018.02); *H04W 4/33* (2018.02); *H04W 64/003* (2013.01)

(58) Field of Classification Search
CPC ... H04W 64/003; H04W 4/023; H04B 17/318
See application file for complete search history.

(56) References Cited

U.S. PATENT DOCUMENTS

| | | | |
|---|---|---|---|
| 2014/0278060 A1 | 9/2014 | Kordari et al. | |
| 2015/0156611 A1 | 6/2015 | Aggarwal et al. | |
| 2015/0358780 A1* | 12/2015 | Saari | G01S 5/14 |
| | | | 370/252 |
| 2017/0332341 A1* | 11/2017 | Aggarwal | H04W 64/00 |
| 2018/0227061 A1* | 8/2018 | Holz | H04B 17/27 |
| 2019/0392649 A1* | 12/2019 | Chen | G06F 3/011 |

* cited by examiner

METHOD FOR GENERATING AN INDOOR ENVIRONMENT MODEL AND A METHOD FOR DETERMINING POSITION DATA FOR A LOCATION IN AN INDOOR ENVIRONMENT

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. § 371 of prior PCT International Application No. PCT/EP2018/050642 which has an International Filing Date of Jan. 11, 2018, which designates the United States of America, and which claims priority to European Application No. 17151637.0 filed Jan. 16, 2017. Each of the aforementioned applications is incorporated by reference herein in its entirety, and each is hereby expressly made a part of this specification.

TECHNICAL FIELD

The present patent application generally relates to indoor positioning. More particularly, it is presented a method for generating an indoor environment model of a building and a method for determining position data for a location in an indoor environment of the building, as well as a system for generating an indoor environment model of a building, and a system for determining position data for a location in the indoor environment of the building.

BACKGROUND

Positioning services are today extensively used all over the world for various applications. A common and straightforward example is to use positioning services for navigation purposes, but position data may also be used indirectly, for instance by using position data for determining what kind of information to present to a user in a news feed.

Even though positioning services are commonly used today, many positioning services are only working adequately in an outdoor environment. A reason for this is that in the outdoor environment, information from a satellite can be received by a mobile phone or other similar device without being hindered, which may be the case when the mobile phone is inside a building. Since satellite communication is in many cases prevented by the building, alternative technical solutions for indoor positioning has been developed.

An example of such a technical solution is making use of that different transmitters in a building, e.g. WiFi Access Points, are communicating with the mobile phone in a location, and that a signal strength is depending on a distance between one of the transmitters and the mobile phone. By combining these facts, it is possible to generate a database of received signal strengths in different known locations and then using this database to determine position data for an unknown location after having measured the received signal strengths.

Even though there today are technologies available for indoor positioning there is a need for improved services in terms of for instance position accuracy. Having an increased position accuracy will have the positive effect that devices can interact with each other more easily. Further, there is a need for more energy efficient indoor positioning devices providing the service. There are several positive effects with such devices, on one hand a time between battery charging can be extended, and on another hand that a cost for the devices can be reduced.

SUMMARY

An objective of the present inventive concept is therefore to provide improved indoor positioning.

This and other objectives of the present inventive concept are at least partially met by the invention as defined in the independent claims. Preferred embodiments are set out in the dependent claims.

According to a first aspect, there is provided a method for generating an indoor environment model of a building, said method comprising forming a communicator location model for defining positions of communicators in said building using gathered information for establishing communicator locations, receiving signal strength indicative measurements being determined for a number of transmitters using at least one electronic communications device, wherein the signal strength indicative measurements are based on a signal which has varying signal propagation characteristics in the indoor environment, and wherein said signal strength indicative measurements are acquired from a number of known locations in the building or locations of said number of transmitters are known; identifying discrepancies of signal transmittance in said indoor environment based on said signal strength indicative measurements in relation to said communicator location model, wherein said communicators are transmitters or electronic communications devices, determining locations of signal hindering elements causing said discrepancies, and generating said indoor environment model including communicator locations and said signal hindering elements.

Thanks to the invention, there is provided a combination of forming a communicator location model with receiving of signal strength indicative measurements based on a signal having varying signal propagation characteristics. The signal strength indicative measurements can thus be used in order to determine presence of any signal hindering elements and, with information of signal strength indicative measurements from a number of locations, an indoor environment model comprising signal hindering elements may be formed.

The communicator location model may be formed in a number of different ways and may be done with high accuracy. This implies that the communicator location model may be very accurate and may be used as input in order to enable determining of positions of signal hindering elements. Thus, the gathered information for establishing the communicator location model could be e.g. actual physical mapping of the communicator locations (by manually or automatically scanning a building to e.g. visually determine transmitter locations).

The communicators may be any type of devices that are able to perform wireless communication with other devices. The communicators may thus be transmitters, which transmit signals for communicating information to receivers. The communicators may also be receivers, which receive information from transmitters. Typically, the communicators may be able to both transmit and receive information.

A communicator may thus be a WiFi transmitter, e.g. part of a wireless local area network (WLAN) in the building. The communicator could also be a Bluetooth Low Energy (BLE) beacon or a WiFi access point, which at least transmit signals providing an identifier of the communicator (and in that sense form transmitters). The communicator may alternatively be a receiver, such as WiFi or Bluetooth receiver, which may be arranged in a fixed location, e.g. if installed in a stationary device such as a refrigerator or a ventilating system in the building.

The communicator location model may thus provide information of locations of communicators, which are stationary or at least not moved during establishing of the indoor environment model.

If a model of transmitter locations is formed, the signal strength indicative measurements from known locations may be used for determining discrepancies of signal transmittance. On the other hand, if a model of receiver locations is formed, the signal strength indicative measurements may be made by the receivers (at least one electronic communications device), which are in the known locations given by the receiver location model. The receivers may then measure the signal strength from a number of mobile transmitters, wherein the measured signal strength is associated with a known location of the mobile transmitter. The location of the transmitter may be known by means of a GPS position or in any other manner.

The communicator location model could also provide both transmitter locations and receiver locations.

A transmitter location model could be formed based on information that is gathered by traversing large areas of the building in an ordered manner so that the location in the building is known. Thus, fingerprinting of received signals in the indoor environment may be performed to relate a fingerprint to a certain location. Also, a transmitter location model may be based on ultrawideband or ultrasound signals. Further, sensor fusion combining information from several sources (such as combining a GPS position with an accelerometer and gyro sensor to determine a location of a gathering device) may be used for gathering information to form the transmitter location model. Also, crowdsourced simultaneous localization and mapping (SLAM) track collected data may be used for forming the transmitter location model.

Thanks to the invention, signals that are affected by the indoor environment, e.g. signals that do not have homogeneous propagation characteristics, may be analyzed in view of the communicator location model so that discrepancies in signal transmittance may be assigned to signal hindering elements. Hence, locations of the signal hindering elements, such as walls or floors of the building, may be determined and included in the indoor environment model.

The indoor environment model may thus take signal hindering elements into account and may allow later positioning of an electronic communications device or a mobile transmitter using the indoor environment model. The positioning may thus be based solely on measured signals that have varying signal propagation characteristics in the indoor environment model.

The indoor environment model may thus be created using information that may be gathered by relatively advanced devices, which may ensure that an accurate communicator location model may be formed. Then, simple devices that may only be able to detect signals having varying propagation characteristics in the indoor environment, e.g. an electronic communications device intended for connecting a device, such as an Internet of Things device, to the Internet, may use the indoor environment model for positioning of the device.

According to an embodiment, the indoor environment model represents radio-frequency signals transmitted from a plurality of transmitter locations and propagating through an indoor model including signal hindering elements.

According to an embodiment, the step of receiving signal strength indicative measurements comprises receiving measurements of received signal strength (RSS) from said number of transmitters using said electronic communications device.

A receiver of a radio-frequency signal may be able to measure a received signal strength. This may commonly be used by electronic communications devices which communicate via radio-frequency signals. Thus, since RSS measurements may anyway be made, the RSS measurements may also be used for positioning of the electronic communications device. Therefore, when building an indoor environment model, it may be highly useful to use RSS measurements in order to create an indoor environment model that models propagation of radio-frequency signals.

Using knowledge of a location where the RSS measurement is acquired, the RSS measurements may be used to identify discrepancies of signal transmittance in the indoor environment.

It should be realized that other signals than a radio frequency signal that may have varying signal propagation characteristics could be used, such as a received sound or ultrasound signal.

According to an embodiment, the step of determining locations of signal hindering elements causing said discrepancies comprises amending propagation loss factors in a signal propagation model. Thus, the signal hindering element may be modeled as an area in the indoor environment model wherein a loss factor may be applied allowing signal propagation to be accurately modeled, which implies that positioning may be performed merely on signals which have varying signal propagation characteristics in the indoor environment.

According to an embodiment, the method further comprises receiving distance indicative data being formed by, for each of a plurality of locations in said building, a set of distance indicative measurements being determined for a number of transmitters in said building by using at least one electronic communications device, wherein said step of forming a communicator location model is based on the received distance indicative data.

Although signal strength indicative measurements may also provide a measure of distance to transmitters (as the signal strength is related to the distance from the transmitters), the distance indication provided by a signal strength indicative measurement may be of low accuracy since the signal strength may also depend on propagation characteristics of the indoor environment. The distance indicative data may therefore provide a measure of distance to transmitters that is of higher accuracy in relation to a distance indication provided by the signal strength indicative measurements.

The communicator location model may thus be formed on measurements performed in a plurality of locations in the building and may provide an accurate model of communicator locations, which may be used for determining the placement of signal hindering elements based on the signal strength indicative measurements.

According to an embodiment, the step of receiving distance indicative data is simultaneous with said step of receiving signal strength indicative measurements.

According to another embodiment, the received signal strength indicative measurements and the received distance indicative data are based on simultaneous signal strength indicative measurements and distance indicative measurements.

The distance indicative measurements may be accurate measurements of distance and could be based on detecting a property which is not affected by an environment in which the distance indicative measurement is made. For instance, the distance indicative measurement may be based on a propagation time of a signal between a communicator and an electronic communications device.

A propagation time of the signal may be determined based on a round trip time (RTT) measuring a time for a message to be sent back and forth between the communicator and the electronic communications device. However, the propagation time may be determined based on a signal travelling only in one direction between the communicator and the electronic communications device, e.g. if clocks of the communicator and the electronic communications device are synchronized or if a plurality of communicators have synchronized clocks such that the electronic communications device may compare time instances at which signals from a plurality of communicators are received.

By simultaneous detection of distance indicative measurements and signal strength measurements, the distance indicative measurements may provide an accurate measurement of a distance between an electronic communications device and a communicator, which accurate distance measurement applies to the signal strength measurements. Thus, an accurate indoor environment model including communicator locations and signal hindering elements may be formed based on distance indicative measurements and signal strength measurements gathered by electronic communications devices.

In an embodiment, distance indicative measurements and signal strength measurements may be acquired using mobile phones and the gathering of information for forming the indoor environment model may thus be suitably performed through crowdsourced information gathered from mobile phones that users are anyway carrying while moving through a building.

According to an embodiment, the step of receiving distance indicative data comprises receiving measurements of round-trip time (RTT) from said number of transmitters using said electronic communications device.

The RTT measurements may thus be used for forming a communicator location model with high accuracy. RTT measurements may provide actual distances to the transmitters regardless of any obstacles between the transmitter and the electronic communications device. The positions of both the transmitters and the electronic communications device acquiring the distance indicative data may be determined based on a plurality of distance indicative data from a plurality of positions.

According to an embodiment, the step of receiving distance indicative data comprises receiving measurements of round-trip time (RTT) from said number of transmitters using said electronic communications device, wherein said step of receiving distance indicative data is simultaneous with said step of receiving signal strength indicative measurements.

The RTT measurements may thus be used for forming a communicator location model with high accuracy. RTT measurements may provide actual distances to the transmitters regardless of any obstacles between the transmitter and the electronic communications device. The positions of both the transmitters and the electronic communications device acquiring the distance indicative data may be determined based on a plurality of distance indicative data from a plurality of positions.

By simultaneous detection of RTT measurements and RSS measurements, the RTT measurements may provide the known location of the RSS measurements. Thus, the indoor environment model including communicator locations and signal hindering elements may be formed based merely on RTT measurements and RSS measurements gathered by electronic communications devices, wherein either the electronic communications devices or the transmitters are stationary. In fact, RTT measurements and RSS measurements may be acquired using mobile phones and the gathering of information for forming the indoor environment model may thus be suitably performed through crowdsourced information gathered from mobile phones that users are anyway carrying while moving through a building.

According to an embodiment, the step of determining locations of signal hindering elements causing said discrepancies comprises processing sets of signal strength indicative measurements from at least a subset of said plurality of locations. Signal strength indicative measurements from a subset of the locations may e.g. indicate an anomaly in a relation between signal strength and distance to a transmitter, which may be used to identify a discrepancy. Other relations of signal strength indicative measurements from a subset of the locations may also be used to identify discrepancies.

It should be realized that it may be sufficient to process signal strength indicative measurements from a subset of the plurality of locations in order to identify discrepancies. Hence, suitable subsets may be chosen and the set of signal strength indicative measurements from these subsets may be processed to determine whether discrepancies exist. However, all signal strength indicative measurements may alternatively be taken into account simultaneously in processing for determining locations of signal hindering elements.

According to an embodiment, the step of identifying discrepancies of signal transmittance in said indoor environment based on said signal strength indicative measurements in relation to said transmitter location model comprises comparing distance indicative measurements with signal strength indicative measurements in at least a subset of said plurality of locations.

By comparing the signal strength indicative measurement to the distance indicative measurement, it may be determined whether any signal hindering element is present between the transmitter and the location of the electronic communications device.

According to an embodiment, the step of identifying discrepancies of signal transmittance in said indoor environment based on said signal strength indicative measurements in relation to said transmitter location model comprises comparing distance indicative measurements based on round-trip time with signal strength indicative measurements in at least a subset of said plurality of locations.

The distance indicative measurements based on RTT may provide an accurate distance from a transmitter to the electronic communications device, regardless of any signal hindering elements between the transmitter and the electronic communications device. By comparing the signal strength indicative measurement to the distance indicative measurement, it may be determined whether any signal hindering element is present between the transmitter and the location of the electronic communications device.

According to an embodiment, the step of identifying discrepancies of signal transmittance in said indoor environment based on signal strength indicative measurements in relation to said communicator location model comprises identifying discrepancies in apparent communicator locations based on said signal strength indicative measurements in at least a subset of said plurality of locations.

The signal strength indicative measurement may define an apparent communicator location based on the measured signal strength and an assumed homogeneous decrease in signal strength in the indoor environment. A difference between the apparent communicator location and a communicator location provided in the communicator location model may thus be used for identifying discrepancies.

According to a second aspect, there is provided a method for determining position data for a location in an indoor environment in a building, said method comprising receiving measurements of received signal strength (RSS) data from a number of transmitters in said location using an electronic communications device, and applying the received measurements of RSS data to an indoor environment model comprising transmitter locations and signal hindering elements in order to determine said position data.

According to a third aspect, there is provided a method for determining position data for a location in an indoor environment in a building, said method comprising receiving measurements of received signal strength (RSS) data from a transmitter in said location using a number of electronic communications devices, applying the received measurements of RSS data to an indoor environment model comprising electronic communications device locations and signal hindering elements in order to determine said position data.

Thus, according to the second and third aspects, position data may be determined in an indoor environment based on RSS data. Although it is possible to acquire further information that may be helpful in correct positioning, it is not necessary to acquire any additional information to the RSS data in order to determine position data.

The RSS data may be measured by an electronic communications device, such that the position data may provide a position of the electronic communications device. Hence, a simple device, which may only be able to detect a signal strength of a number of transmitters may be positioned in the indoor environment.

Also, the RSS data may be measured by stationary electronic communications devices in relation to a mobile transmitter, such as a simple BLE beacon. Hence, a simple device, which may transmit a signal so as to enable detection of a signal strength by a number of receivers may be positioned in the indoor environment.

Thanks to the use of an indoor environment model which comprises signal hindering elements, the position data may be determined directly based on the model and there is no requirement of e.g. performing arduous gathering of fingerprint profiles of signal strengths in different positions in order to enable determining position data. For instance, gathering of fingerprint profiles may need to be updated at regular intervals in order to enable handling of transmitters being removed, installed and moved.

Using the indoor environment model according to the invention enables updating communicator locations based on information acquired when position data is to be determined (e.g. for some requests of determining position data, both RSS data and other data, such as RTT data, may be available). When communicator locations are updated in the indoor environment model, position data may be immediately be accurately determined based on the updated environment model without requiring gathering of any further information, such as fingerprint profiles. This is possible since the indoor environment model comprises signal hindering elements and may therefore accurately model signal transmittance through the indoor environment.

The measurements may be received by a processing unit, which may e.g. be arranged in the electronic communications device or may be arranged in a remote computer connected to the electronic communications device. The processing unit may have access to the indoor environment model and may return position data upon receiving a request for position data. For example, a remote computer may store the indoor environment model. The electronic communications device and the remote computer may be directly connected or may be connected through a number of intermediate units. Thus, the electronic communications device may be connected to an operator providing mobile communications services and may provide the RSS data to the operator. The operator may in turn forward the RSS data to a remote computer, which may determine the position data.

Effects and features of these second and third aspects are largely analogous to those described above in connection with the first aspect. Embodiments mentioned in relation to the first aspect are largely compatible with the second and third aspects.

According to an embodiment, said indoor model is used for setting factor weights in a propagation model. The factor weights may apply to propagation of signals through signal hindering elements, such that transmittance through the signal hindering elements may be correctly predicted by the indoor environment model.

The position data may be determined by taking the RSS data and applying the RSS data to the indoor environment model in order to determine a distance to each of the transmitters of the number of transmitters. Then, the position data may be derived based on the plurality of determined distances.

According to an alternative embodiment, the step of applying the received measurements of RSS data to an indoor environment model comprising transmitter locations and signal hindering elements in order to determine said position data further comprises comparing said RSS data to an RSS reference database, wherein said RSS reference database comprises RSS data linked to position data.

Thus, the indoor environment model may be used for simulating signal propagation through the building, such that a RSS reference database may be formed. The RSS reference database may thus provide fingerprint profiles of positions within the building. However, the fingerprint profiles need not be acquired by arduous gathering of RSS data in all the locations of the building. Rather, the RSS reference database may be calculated based on transmitter locations and a propagation model including varying factor weights in the building taking locations of signal hindering elements into account.

According to an embodiment, the position data comprises three dimensional position data. The indoor environment model may include both walls and floors forming the signal hindering elements. Thus, by modeling floors of the building, the position data may be provided in three dimensions.

According to an embodiment, the method further comprises receiving position data for an outdoor location in the vicinity of said building, and downloading said indoor environment model to said electronic communications device.

The electronic communications device may be accurately positioned when being outdoors, using e.g. global positioning system (GPS) signals. When arranged in an indoor environment, positioning may be more difficult as GPS signals may not reach the electronic communications device and connection to a computer network in which a remote computer is situated may be deteriorated, such that the electronic communications device may lose connection to a remote computer providing positioning of the electronic communications device. Thus, by downloading the indoor environment model to the electronic communications device prior to entering the building, the electronic communications device may determine position data without requiring a connection to the remote computer.

According to a fourth aspect, there is provided a system for generating an indoor environment model of a building, said system comprising a data processing device configured to form a communicator location model for defining positions of communicators in said building using gathered information for establishing communicator locations, receive signal strength indicative measurements being determined for a number of transmitters using at least one electronic communications device, wherein the signal strength indicative measurements are based on a signal which has varying signal propagation characteristics in the indoor environment, and wherein said signal strength indicative measurements are acquired from a number of known locations in the building or locations of said number of transmitters in the building are known, identify discrepancies of signal transmittance in said indoor environment based on said signal strength indicative measurements in relation to said communicator location model, wherein said communicators are transmitters or electronic communications devices, determine locations of signal hindering elements causing said discrepancies, and generate said indoor environment model including communicator locations and said signal hindering elements.

Effects and features of this fourth aspect are largely analogous to those described above in connection with the first, second, and third aspects. Embodiments mentioned in relation to the first, second, and third aspects are largely compatible with the fourth aspect.

According to a fifth aspect, there is provided a system for determining position data for a location in an indoor environment in a building, said system comprising a data processing device configured to receive measurements of received signal strength (RSS) data from a number of transmitters in said location using an electronic communications device, and apply the received measurements of RSS data to an indoor environment model comprising transmitter locations and signal hindering elements in order to determine said position data.

Effects and features of this fifth aspect are largely analogous to those described above in connection with the first, second, third, and fourth aspects. Embodiments mentioned in relation to the first, second, third, and fourth aspects are largely compatible with the fifth aspect.

According to a sixth aspect there is provided a mobile apparatus, which may measure the signal strength of and distance to communicators and which may be used for gathering data for forming a model of an environment. The apparatus may perform signal strength indicative measurements or distance indicative measurements or both. The apparatus may further comprise a sensor for GPS positioning or a sensor for detecting movement of the mobile apparatus (such as a sensor measuring angular rotation of a wheel of the mobile apparatus) or any combination of them. The methods of the previously described aspects may be performed by, through or with the apparatus.

In an embodiment, the mobile apparatus may be a self-controlled movable apparatus, which may be configured to autonomously move through an indoor environment while making simultaneous signal strength indicative measurements and distance indicative measurements. The mobile apparatus may comprise further sensors for detecting its position, such as a GPS positioning sensor, which may be combined with a sensor following the movement of the mobile apparatus (such as a sensor measuring angular rotation of a wheel of the mobile apparatus) for keeping track of its position even if GPS positions are not continuously available.

The mobile apparatus may traverse the indoor environment in order to obtain related distance indicative measurements and signal strength indicative measurements for communicators in positions within the indoor environment.

The mobile apparatus may comprise additional sensor(s) for mapping the indoor environment, such as a sensor for detecting obstacles, such as walls in the indoor environment and mapping the walls in the indoor environment. Such additional sensors may include at least one of a camera, using image analysis to identify walls, a ranging detector based on radio technology (radar transmitter/receiver) or light (lidar transmitter/receiver) for detecting a signal reflected by an object and, hence, a distance to the object.

Information gathered by such a mobile apparatus, which may autonomously move through the indoor environment while gathering measurement data, may be useful in forming an accurate indoor environment model including communicator locations and signal hindering elements.

BRIEF DESCRIPTION OF THE DRAWINGS

The above, as well as additional objects, features and advantages of the subject matter of this patent application, will be better understood through the following illustrative and non-limiting detailed description, with reference to the appended drawings, wherein.

DETAILED DESCRIPTION

Detailed embodiments of the present invention will now be described with reference to the drawings.

In the detailed description, an indoor environment model will be described based on a number of stationary transmitters in a building and at least one electronic communications device which is movable in the building. However, it should be realized that instead the electronic communications device may form a receiver which is stationary in the building and at least one transmitter may be movable in the building. Thus, although a transmitter location model is referred to, the transmitter location model could be replaced by a receiver location model instead. Also, a combination of transmitter locations and receiver locations may be used. However, for simplicity and brevity, it is below assumed that a number of transmitters are stationary in the building and that at least one electronic communications device is moved in the building.

Figure 1A:
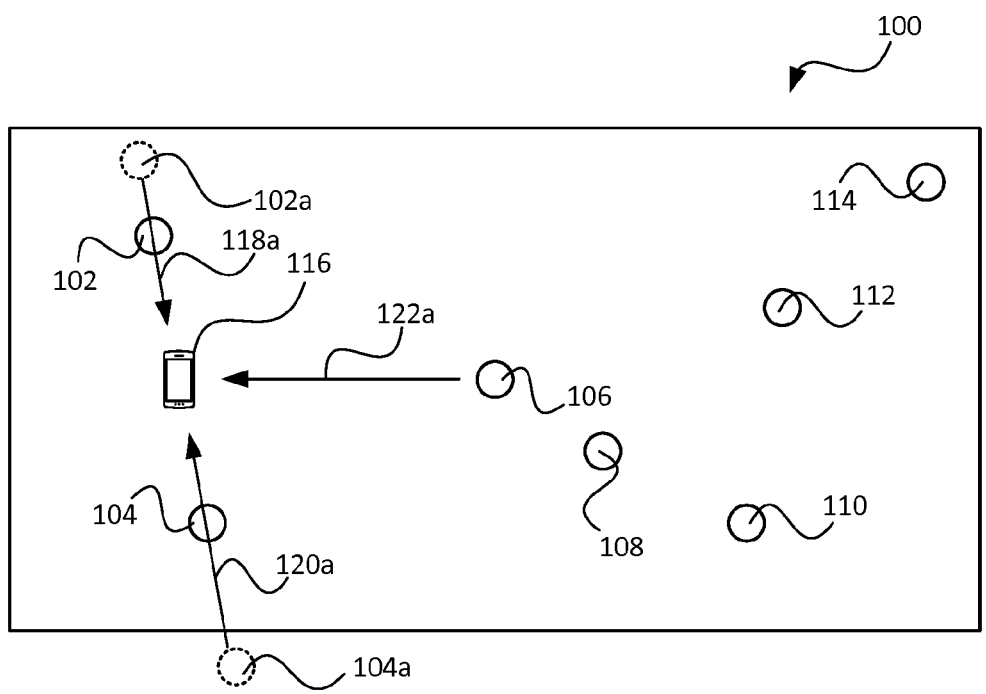
FIG. 1a is a schematic illustration of a building comprising a number of transmitters and an electronic communications device in a first location.

With reference to FIG. 1a it is by way of example illustrated a schematic illustration of a building 100 in which a number of transmitters—a first transmitter 102, a second transmitter 104, a third transmitter 106, a fourth transmitter 108, a fifth transmitter 110, a sixth transmitter 112 and a seventh transmitter 114—are placed. The number of transmitters may be WiFi access points, Bluetooth beacons or any other device transmitting signals that may be received by a communications device 116, e.g. for exchanging information between the transmitters and the communications device 116. In FIG. 1a the communications device 116 is placed in a first location and in this location it may receive signals from the first transmitter 102, the second transmitter 104 and the third transmitter 106, as illustrated. A signal received from the first transmitter 102 is having a first received signal strength (RSS) 118a, and correspondingly a signal from the second transmitter can have a second RSS 120a, and a signal from the third transmitter can have a third RSS 122a. The first RSS 118a, the second RSS 120a and the third RSS 122a all have roughly the same signal strength. Since the signal strength is distance dependent, it can thereby be assumed that the first, second and third transmitter 102, 104, 106 are placed on the same distance from the communications device 116 placed in the first location. Hence, because there are elements affecting signal propagation in the building 100, the communications device 116 can incorrectly assume that the first transmitter 102 is placed farther away in position 102a, and correspondingly that the second transmitter 104 is placed farther away in position 104a.

Figure 1B:
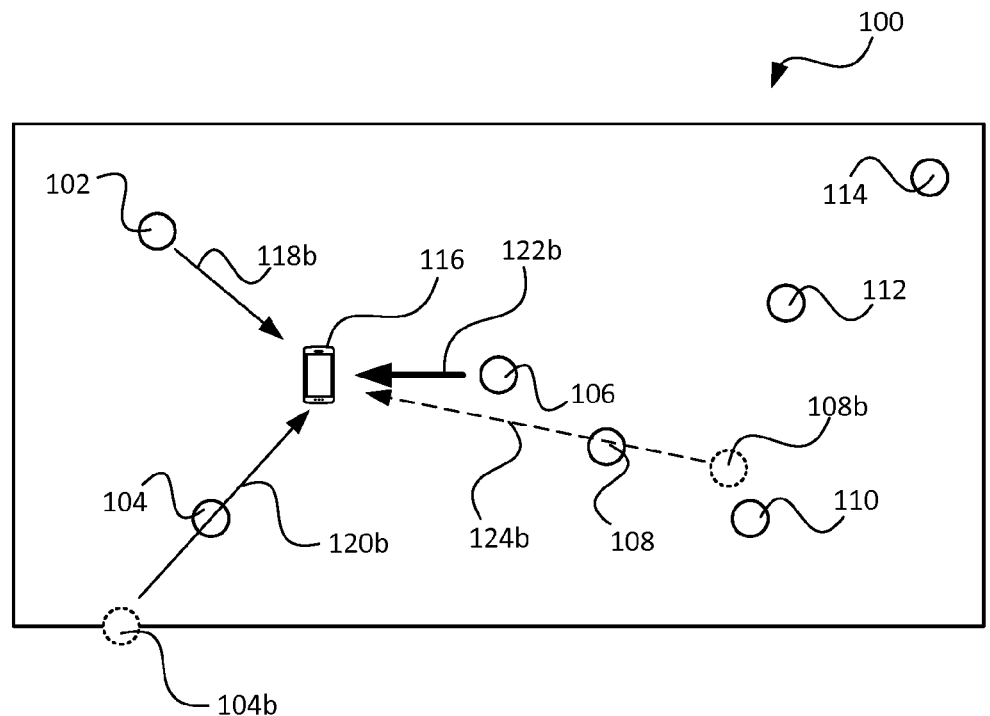
FIG. 1b a schematic illustration of the building of FIG. 1a with the electronic communications device in a second location.

In FIG. 1b it is by way of example illustrated the building 100, but with the communications device 116 placed in a second location. In this second location first RSS data 118b is received from the first transmitter 102, second RSS data 120b is received from the second transmitter 104, third RSS data 122b is received from the third transmitter 106 and fourth RSS data 124b is received from the fourth transmitter 108. Unlike when having the communications device 116 placed in the first location, as illustrated in FIG. 1a, the first RSS data 118b corresponds to a distance between the communications device 116 and the first transmitter 102.

The RSS data 120b does however not correspond to an actual distance between the communications device 116 and the second transmitter 104, and hence the second transmitter may incorrectly be assumed to be in position 104b. The third RSS data 122b indicates by virtue of a stronger signal that a distance between the communications device 116 and the third transmitter 106 is shorter than the distance between the two in the first location as illustrated in FIG. 1a, which is correct and the transmitter 106 can be assumed by the communications device 116 to be in its actual position. In this second location, also fourth RSS data 124b is received from the fourth transmitter 108. The fourth RSS data 124b indicates that the fourth transmitter 108 is positioned farther away from the communications device 116 than an actual distance and therefore the fourth transmitter can be incorrectly assumed to be placed in location 108b.

As illustrated by the RSS data acquired by the communications device 116 in the first and second locations, the RSS data is difficult to use for determining placement of transmitters. Similarly, if the position of transmitters are known and the position of the communications device 116 is to be determined based on RSS data, an estimation of the position of the communications device 116 may be completely incorrect if the RSS data is used as a single measure of distance between the transmitters and the communications device 116.

In order to enable using RSS data for positioning of a communications device 116, a transmitter location model may be formed such that locations of the transmitters are indicated with high accuracy. The transmitter location model may be formed in a number of different ways and may be based on information which may be gathered simultaneously with gathering of RSS data or in a separate process.

For instance, the transmitter location model may be based on actual knowledge of the transmitter locations, such as information manually provided in connection with installation of the transmitters, or by manual or automatic inspection of the building 100 to visually locate the transmitters.

However, the transmitter location model may also or alternatively be based on information gathered from a plurality of locations in the building 100, wherein each location from which information is gathered may be known in some other manner (e.g. by manual input, by gathering information using a robot knowing how the robot is moved, by obtaining position information in another manner, such as a GPS position). The information may be gathered by performing sensing or measurement in relation to transmitters. Thus, signals from transmitters may be acquired from the plurality of locations and the information from the plurality of locations may be used in order to calculate the transmitter locations.

The gathered information may be based on distance indicative measurements. The gathered information based on signals from transmitters may be round-trip time (RTT) data, which may be a very accurate measure of a distance to the transmitter as the time for a signal to travel back and forth between the communications device and a transmitter is affected to a very small extent by a material in which the signal travels. The gathered information may also be RSS data. Based on RTT data and/or RSS data from a large number of locations within the building 100, the transmitter locations may be computed and a transmitter location model may be formed.

Further, it should be realized that other information may be used for establishing transmitter locations. For instance, sensor fusion combining information from several sources (such as combining a GPS position with an accelerometer and/or gyro sensor to determine a location of a gathering device) may be used for gathering information to form the transmitter location model. Also, crowdsourced simultaneous localization and mapping (SLAM) track collected data may be used for forming the transmitter location model.

When the transmitter location model is formed, RSS data may be analyzed in order to identify discrepancies of signal transmittance. Such discrepancies may correspond to the RSS data in one or more locations not fitting with the transmitter location model. Discrepancies of a transmitter location may occur in some locations of acquiring of RSS data and, using a combination of the information from plural locations may enable providing an improved indoor environment model.

For example, the first transmitter 102 is in the first location incorrectly determined by the communications device 116 to be in the apparent location 102a, while in the second location the first transmitter 102 is correctly determined to be in its correct position. The second transmitter 104 is in the first location of the communications device 116 incorrectly determined to be in the apparent position 104a and in the second location of the communications device 116 incorrectly determined to be in the position 104b. The third transmitter 106 is in both the first and second location determined to be in its correct location. The signal from the fourth transmitter 108 is only received by the communications device 116 in the second location and then it is incorrectly determined to be in the apparent location 108b. When having RSS data from additional locations discrepancies can be identified in more detail.

Figure 1C:
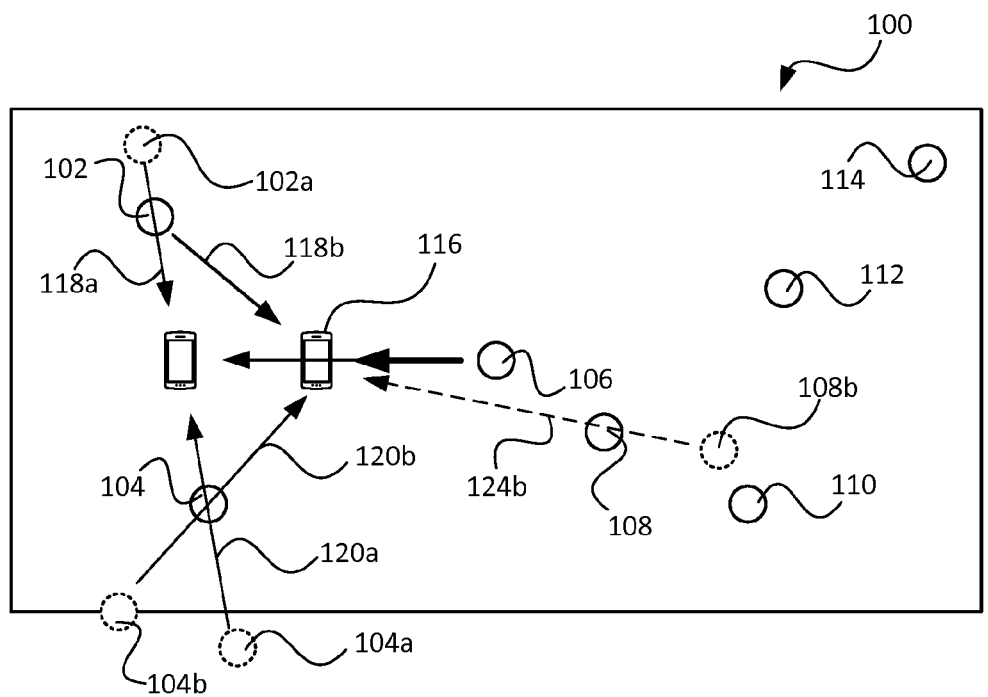
FIG. 1c illustrates a combination of the schematic illustrations of FIGS. 1a and 1b.

When having identified discrepancies between the transmitter location models formed by RSS data from different locations, as illustrated in FIG. 1c, these identified discrepancies can in turn provide for that an indoor environment model of the building 100 can be determined. In short, RSS data for different locations for several communications devices are used as input to an indoor environment modelling software, which may run on a cloud computing apparatus. The software comprises algorithms for generating the indoor environment model such that the discrepancies observed in relation to the transmitter location model may be taken into account. In other words, the software can use the RSS data to estimate where the walls or other signal hindering elements are placed, and can as a subsequent step create the indoor environment model.

The discrepancies may be identified in several different ways. Thus, a discrepancy may be identified by comparing RSS data from different locations. A discrepancy may be identified by comparing distance indicative measurements with signal strength indicative measurements in order to determine whether a similar distance to a transmitter may be estimated by both the distance indicative measurements and the signal strength indicative measurements. A discrepancy may be identified by comparing RSS data to RTT data in order to determine whether a similar distance to a transmitter may be estimated by both the RSS data and the RTT data. A discrepancy may be identified by comparing an apparent location of a transmitter to a known location of the transmitter according to the transmitter location model.

To estimate locations of signal hindering elements different signal propagation models may be used, for instance a log-distance path loss model, which in a simplified form can be expressed as:

$$Prx(dBm)=Ptx(dBm@1\ m)-10*\gamma*\log 10(d)-\Sigma_{i=1}^{n}Pw(i)-\Sigma_{j=1}^{nn}Pf(nn)-N(s)$$

where
Prx(dBm) is the received signal power,
Ptx(dBm@1 m) is the transmit power measured by the receiver at 1 m distance from the transmitter,
$\gamma$ is an average RF damping factor for an unobstructed signal in the indoor environment, normally a value of 2 may be used for $\gamma$,
d is the distance between transmitter and receiver in meters,
Pw(i) is a wall penetration loss factor for wall i, where n is number of walls between transmitter and receiver,
Pf(j) is an optional floor penetration loss factor for floor j, where
nn is number of floors between transmitter and receiver, and
N is the random Gaussian noise with 0 mean and a standard deviation S.

Figure 1D:
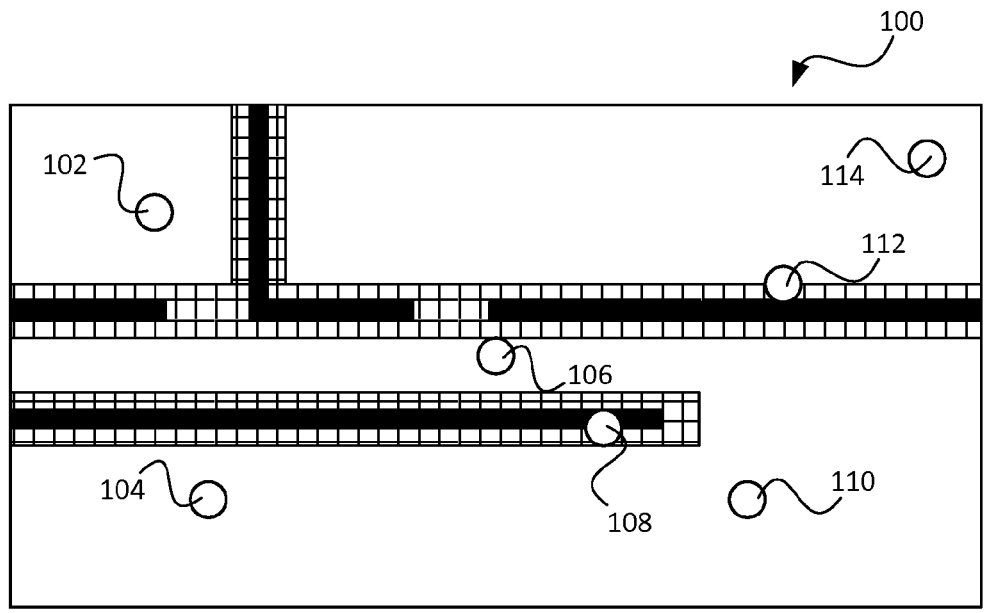
FIG. 1d illustrates an example of an indoor environment model.

As illustrated in FIG. 1d, instead of using a binary model, i.e. for each location having either a signal hindering element or free space, a probability for each location may be used.

An indoor environment model may thus be formed, wherein transmitter locations are provided and locations of signal hindering elements are provided. The signal propagation model may then be used in order to determine a signal strength that is to be received in a position in the indoor environment, such that measured RSS data from an unknown position may be used for determining a location of the unknown position in the building 100.

Further, if the location of the electronic communications device is known, e.g. via a GPS signal, this may also be input to the indoor environment modelling software. An advantage of this is that the indoor environment model can be linked to a surrounding outdoor environment.

FIG. 1d is presenting an example of such an indoor environment model based on discrepancies identified based on RSS data from different locations, including the first and second location illustrated in FIGS. 1a and 1b.

In the indoor environment model, locations of signal hindering elements, such as walls, are determined. In the example illustrated in FIG. 1d the black areas are areas where it is high likelihood that there are signal hindering elements placed, the checkered areas are areas where it is medium likelihood that there are signal hindering elements placed, and the white areas are areas where it is low likelihood that there are signal hindering elements placed. This model may continuously be updated when new RSS data and/or RTT data is provided, and it may also give increased weight to new data.

As can be seen by studying the indoor environment model illustrated in FIG. 1d, the first transmitter 102 was incorrectly placed in the first location, as illustrated in FIG. 1a, because there was a wall hindering the signal and thus providing a lower RSS than the distance between the first location and the actual position of the first transmitter 102 should have given rise to. In the second location, as illustrated in FIG. 1b, there was no wall hindering and the RSS data corresponded to the distance.

For the second transmitter 104, there was both in the first and second location a wall placed between the second transmitter 104 and the communications device 116 resulting in that the second transmitter 104 was incorrectly determined to be farther away for both locations.

For the third transmitter 106 there was in both the first and second location no signal hindering elements between the second transmitter 106 and the communications device 116, hence the second transmitter was correctly positioned for both positions.

For the fourth transmitter 108 there was no received signal in the first location. In the second location there was a wall hindering the signal, and hence based on the RSS data the location of the third transmitter 108 was incorrectly determined to be farther away than the actual position.

Figure 2A:
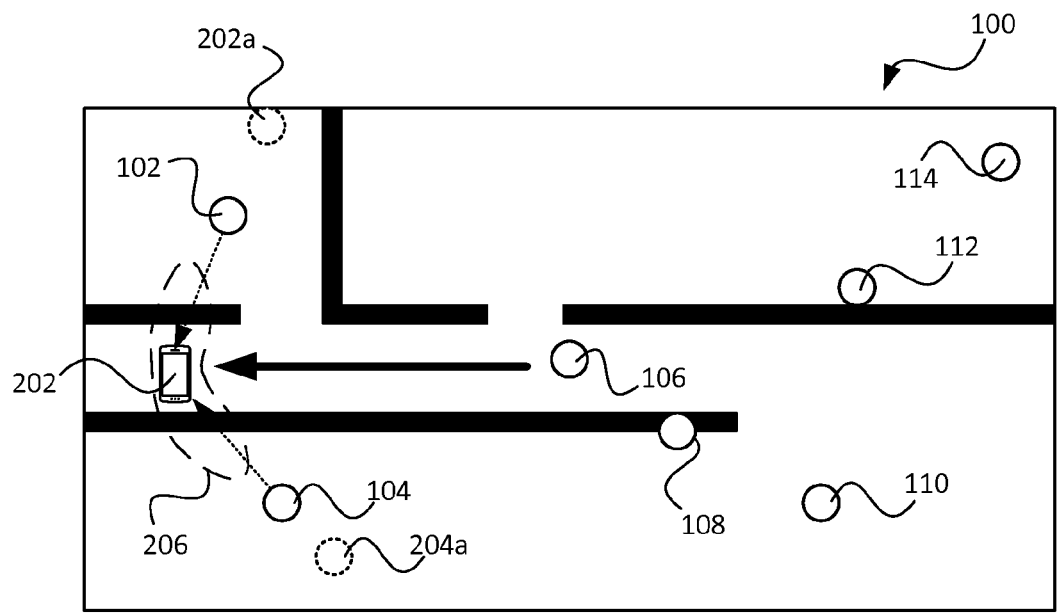
FIG. 2a illustrates an example of an electronic communications device, for which position data is to be determined, in a building, wherein an indoor environment model has not been applied.
Figure 2B:
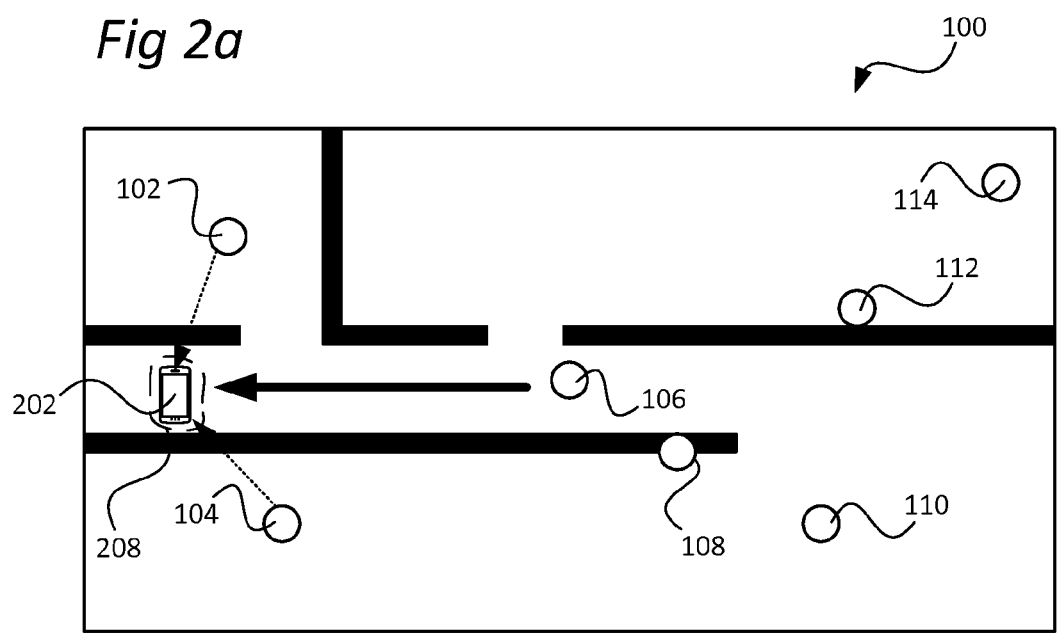
FIG. 2b illustrates an example of an electronic communications device, for which position data is to be determined, in a building, wherein an indoor environment model has been applied.

FIG. 2*a* and FIG. 2*b* are illustrating an example of how the indoor environment model may be used for determining position data for a location in a building 200.

In a first step, illustrated in FIG. 2*a*, RSS data is received by a communications device 202 from the first transmitter 102, the second transmitter 104 and the third transmitter 106. Due to walls separating the communications device 202 from the first transmitter 102 and the second transmitter 104, the RSS data from these two transmitters will indicate that these are placed farther away from the communications device 202 than their actual positions. Since the distance between the first transmitter 102 and the communications device 202, and the distance between the second transmitter 104 and the communications device 202 are not accurately determined, the position data for the communications device 202 will therefore not be possible to be accurately determined and there is a large uncertainty in the position data, as illustrated by a large area 206.

By having the indoor environment model, the model for determining a distance based on the RSS data may be amended, e.g. by including a factor Pw(i) and providing a suitable propagation loss factor for the wall in the log-distance path loss model described above, such that signal hindering elements are taken into account.

After having taken into account the signal hindering elements, an improved accuracy of distances between the communications device 202 and the first transmitter 102, and the communications device 202 and the second transmitter 104 may be achieved, as illustrated in FIG. 2*b*, which results in a positive effect that the position data of the communications device 202 may be accurately determined, as illustrated by a small position area 208.

According to an alternative, the received measurements of RSS data may be compared to an RSS reference database, which may be formed by predicting measured RSS data based on the indoor environment model. The RSS reference database may thus comprise predicted RSS data linked to position data. By comparing the measured RSS data to the RSS reference database, a match in the RSS reference database may be found and the position data may be directly fetched as the position data linked to the predicted RSS data matching the measured RSS data.

Thus, the indoor environment model may be used for simulating signal propagation through the building, such that a RSS reference database may be formed. The RSS reference database may thus provide fingerprint profiles of positions within the building and the position data may be quickly determined by looking up matching RSS data in the RSS database rather than calculating the position data from measured RSS data. The RSS reference database may comprise only predicted RSS data for the most common locations in the building, such that positioning in these locations may be quickly performed. If no match is found in the RSS reference database, positioning based on calculations using the indoor environment model may be performed instead.

The fingerprint profiles of the RSS reference database need not be acquired by arduous gathering of RSS data in all the locations of the building. Rather, the RSS reference database may be calculated based on transmitter locations and a propagation model including varying factor weights in the building taking locations of signal hindering elements into account.

Figure 3:
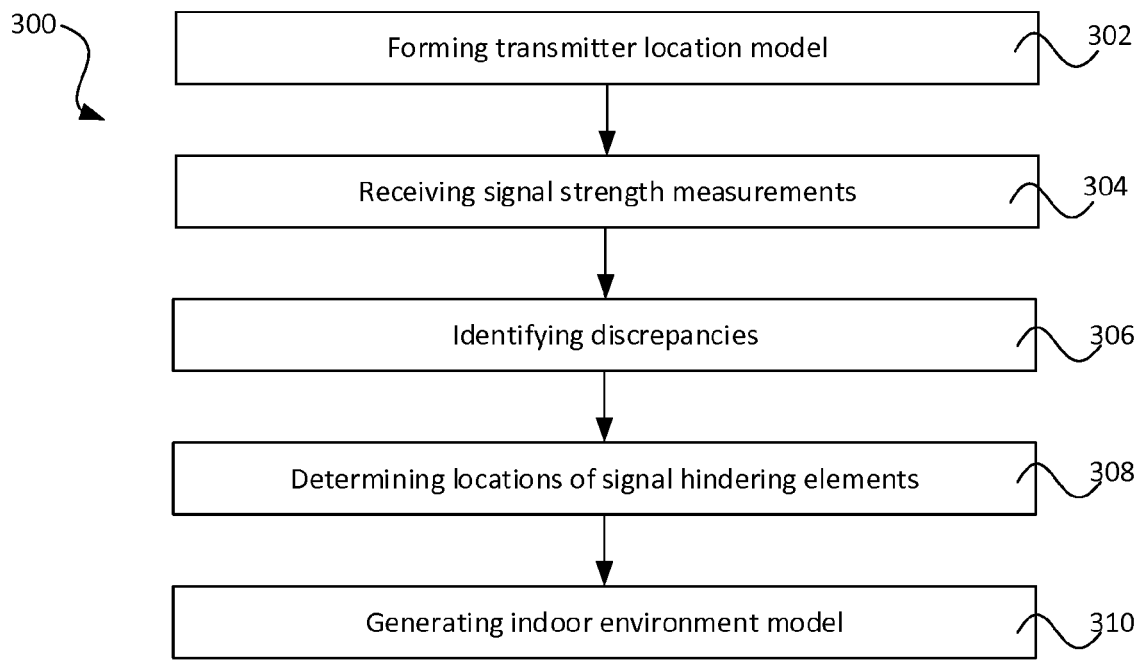
FIG. 3 illustrates a flowchart of a method for generating an indoor environment model of a building.

FIG. 3 generally illustrates a flowchart 300 for generating an indoor environment model of a building.

In a first step 302, a transmitter location model is formed. The transmitter location model may be formed based on distance indicative measurements, which may be acquired from a plurality of locations while also acquiring signal strength indicative measurements.

In an embodiment, the transmitter location model may be formed based on RTT data, which may be acquired from a plurality of locations while also acquiring RSS data.

In a second step 304, signal strength indicative measurements are received from a number of known locations in the building, and in a third step 306 discrepancies of signal transmittance in the indoor environment are identified.

Based on the discrepancies locations of signal hindering elements may be determined in a fourth step 308.

After having determined the locations of the signal hindering elements, an indoor environment model can be generated in a fifth step 310.

Figure 4:
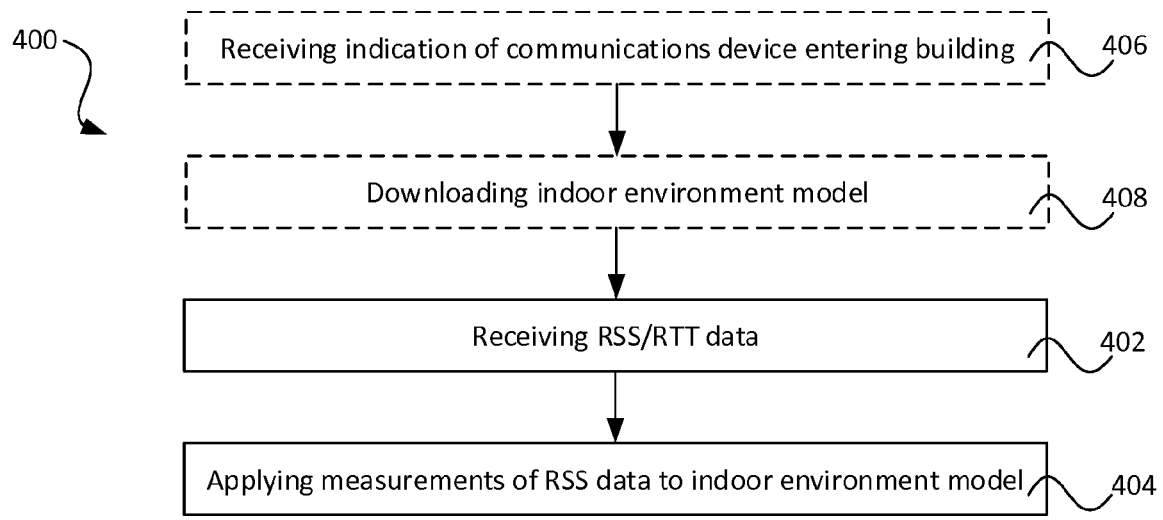
FIG. 4 illustrates a flowchart of method for determining position data for a location in an indoor environment in a building.

FIG. 4 illustrates a flowchart 400 of a method for determining position data for a location in an indoor environment in a building.

In a first step 402, RSS data and/or RTT data can be received.

In a second step 404, the RSS data and/or RTT data are applied to an indoor environment model. By doing so distances between transmitters and a communications device, for which the position data is to be determined, can be determined with improved accuracy, which in turn provides for that the position data can be determined with improved accuracy.

Optionally, before the first step, in step 406 an indication that the communications device is in the vicinity of, e.g. entering, the building may be received. This may for instance be that the communications device is located using GPS data to be close to an entrance of the building or that the communications device is in communication with or receives a signal that enables determining an identifier of a transmitter in the building. Receiving this indication can trigger that the indoor environment model is downloaded to the communications device. By doing so, faster access to the indoor environment model may be achieved as the indoor environment model may then be available locally in the communications device. Indoor environment models which are likely to be used may alternatively or also be pre-installed in the communications device, such as indoor environment models for all buildings in a city, or indoor environment models for all buildings in a state, in which the communications device will be used.

Although methods generating the indoor environment model and methods for determining position data for a location in an indoor environment are presented above in two dimensions, the principles are not restricted to only two dimensions, but can also be used in three dimensional context.

Figure 5A:
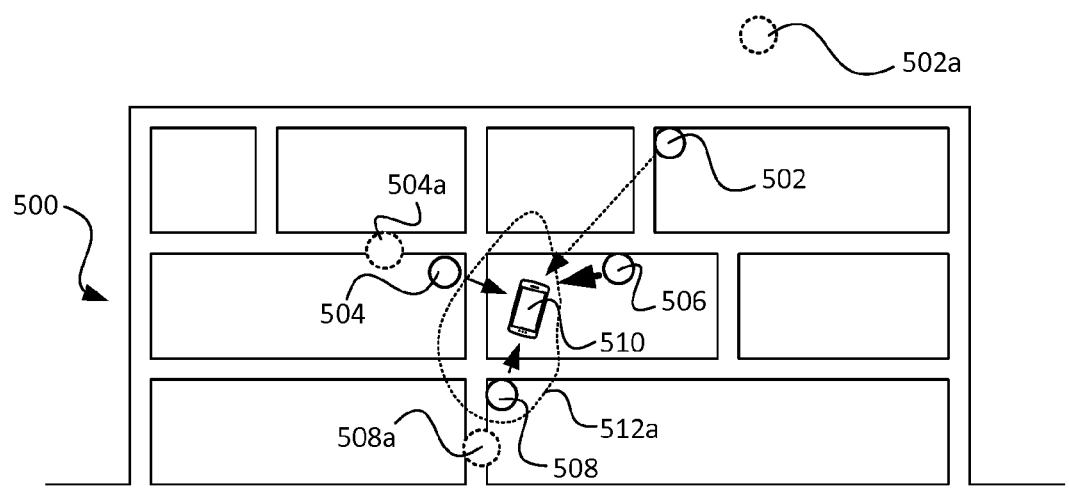
FIG. 5a illustrates by way of example a three story building with a number of transmitters and an electronic communications device for which position data is to be determined, wherein an indoor environment model has not been applied.

FIG. 5*a* illustrates by way of example a three story building 500 in which four transmitters are placed—a first transmitter 502 placed on a second floor, a second transmitter 504 placed on a first floor, a third transmitter 506 also placed on the first floor, and a fourth transmitter 508 placed on a ground floor. A communications device 510 is placed on the first floor and is in communication with or at least receives signals from all four transmitters. Due to that a wall and a floor are hindering signals between the first transmitter 502 and the communications device 510 the RSS data measured by the communications device indicates that the first transmitter is placed in a position 502*a* farther away from the communications device. Similarly, due to a wall hindering signals between the second transmitter 504 and the communications device 510 the second transmitter 504 is indicated in a position 504*a*, and due to a floor hindering signals the fourth transmitter 508 is indicated to be in position 508*a*. Hence, due to that the distances between the communications device 510 and the transmitters are not accurately determined, the position data for the communications device 510 will therefore not be possible to be accurately determined and there is a large uncertainty in the position data, as illustrated by a large area 512*a*.

Figure 5B:
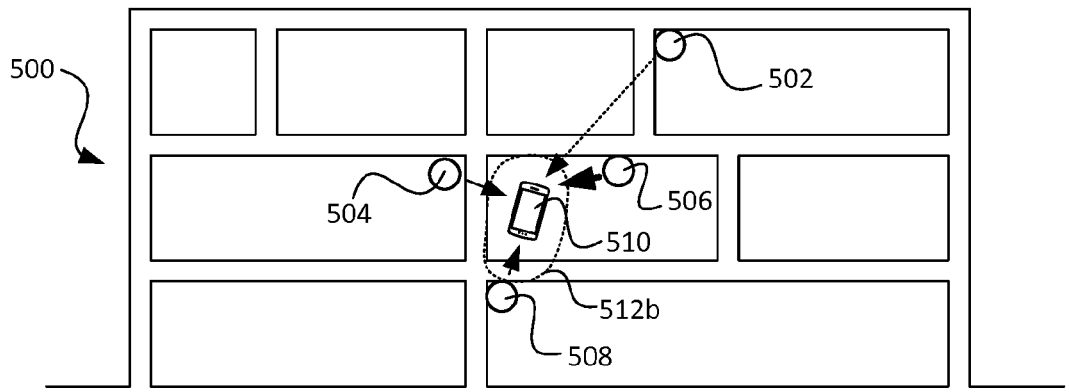
FIG. 5b illustrates by way of example the three story building with a number of transmitters and an electronic communications device for which position data is to be determined, wherein an indoor environment model has been applied.

By applying the indoor environment model, in other words taking into account estimated positions of signal hindering elements, signal propagation of signals transmitted from the transmitters 502, 504, 506, 508 may be modeled with improved accuracy, as illustrated in FIG. 5*b* by way of example. By being able to more correctly determine a distance between the communications device 510 and the transmitters 502, 504, 506, 510, the position data of the communications device may be determined more accurately, which results in that the communications device 510 may be determined to be positioned within a small position area 512*b*.

In order to be able to generate reliable indoor environment models, RSS data and/or RTT data from a large number of communications devices may continuously be gathered. Measuring the RSS data and/or RTT data and transferring this data may be done by a user actively requesting such actions, but it can just as well be made automatically.

Figure 6:
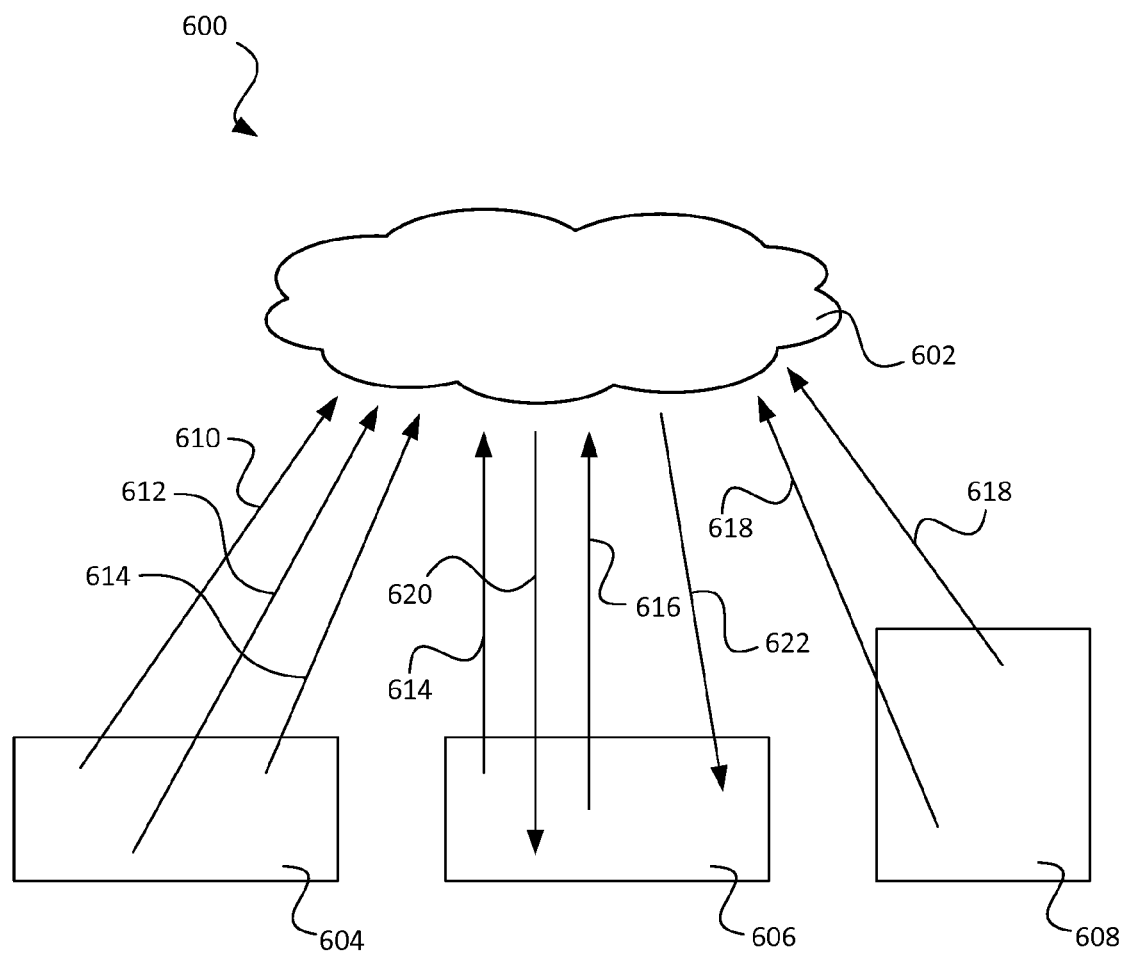
FIG. 6 generally illustrates a system comprising a cloud computing service and in communication with electronic communications devices in three buildings.

FIG. 6 illustrates by way of example a system 600 comprising a cloud computing service 602, a first building 604, a second building 606 and a third building 608. At a point of time, by way of example, the cloud computing service 602 may receive RSS data and/or RTT data from three different locations 610, 612, 614 from the first building 604. Further, the cloud computing service 602 may receive RSS data and/or RTT data from two different locations 614, 616 from the second building 606, and the cloud computing service 602 may receive RSS data and/or RTT data from two different locations 618, 620 from the third building 606. Based on this data indoor environment models for the buildings are generated, which may be creating a new indoor environment model if there is no one existing or updating if there is an already existing indoor environment model.

Information on the indoor environment model may be transferred to communications devices in order to be able to apply this to measured RSS data and/or RTT data in order to be able to determine position data with improved accuracy, as described above in further detail. In FIG. 6, by way of example, it is illustrated that information on the indoor environment model is transferred 622, 624 from the cloud computing service to two communications devices at two different locations in the second building 606.

Alternatively, the indoor environment model may be stored in the cloud computing service 602. Requests comprising RSS data and/or RTT data may be transmitted from communications devices to the cloud computing service. The cloud computing service may then determine position data in the indoor environment for the communications device and return the position data to the communications device as a response to a request.

The methods, apparatuses and systems have mainly been described above with reference to a few embodiments. However, as is readily appreciated by a person skilled in the art, other embodiments than the ones disclosed above are equally possible within the scope of the claimed subject matter, as defined by the appended patent claims.

The invention claimed is:

1. A method for generating an indoor environment model of a building, said method comprising forming a communicator location model for defining positions of communicators in said building using gathered information for establishing communicator locations;

receiving signal strength indicative measurements being determined for a number of transmitters using at least one electronic communications device, wherein the signal strength indicative measurements are based on a signal which has varying signal propagation characteristics in the indoor environment, and wherein said signal strength indicative measurements are acquired from a number of known locations in the building or locations of said number of transmitters in the building are known;

receiving distance indicative data being formed by, for each of a plurality of locations in said building, a set of distance indicative measurements being determined for a number of transmitters in said building by using at least one electronic communications device, wherein said step of forming a communicator location model is based on the received distance indicative data, wherein said step of receiving distance indicative data is simultaneous with said step of receiving signal strength indicative measurements;

identifying discrepancies of signal transmittance in said indoor environment based on said signal strength indicative measurements in relation to said communicator location model, wherein said communicators are transmitters or electronic communications devices;

determining locations of signal hindering elements causing said discrepancies; and generating said indoor environment model including communicator locations and said signal hindering elements.

2. The method according to claim 1, wherein said step of determining locations of signal hindering elements causing said discrepancies comprising amending propagation loss factors in a signal propagation model.

3. The method according to claim 1, wherein said step of determining locations of signal hindering elements causing said discrepancies, comprises processing sets of signal strength indicative measurements from at least a subset of said plurality of locations.

4. The method according to claim 1, wherein said step of identifying discrepancies of signal transmittance in said indoor environment based on said signal strength indicative measurements in relation to said communicator location model, comprising comparing distance indicative measurements with signal strength indicative measurements in at least a subset of said plurality of locations.

5. The method according to claim 1, wherein said step of identifying discrepancies of signal transmittance in said indoor environment based on signal strength indicative measurements in relation to said communicator location model, comprises identifying discrepancies in apparent communicator locations based on said signal strength indicative measurements in at least a subset of said plurality of locations.

6. The method according to claim 1, wherein said indoor environment model represents radio-frequency signals transmitted from a plurality of transmitter locations and propagating through an indoor model including signal hindering elements.

7. A system for generating an indoor environment model of a building, said system comprising
a data processing device configured to:
- form a communicator location model for defining positions of communicators in said building using gathered information for establishing communicator locations,
- receive signal strength indicative measurements being determined for a number of transmitters using at least one electronic communications device, wherein the signal strength indicative measurements are based on a signal which has varying signal propagation characteristics in the indoor environment, and wherein said signal strength indicative measurements are acquired from a number of known locations in the building or locations of said number of transmitters in the building are known,
- receive distance indicative data being formed by, for each of a plurality of locations in said building, a set of distance indicative measurements being determined for a number of transmitters in said building by using at least one electronic communications device, wherein said step of forming a communicator location model is based on the received distance indicative data, wherein said step of receiving distance indicative data is simultaneous with said step of receiving signal strength indicative measurements,
- identify discrepancies of signal transmittance in said indoor environment based on said signal strength indicative measurements in relation to said communicator location model,
- wherein said communicators are transmitters or electronic communications devices,
- determine locations of signal hindering elements causing said discrepancies, and
- generate said indoor environment model including communicator locations and said signal hindering elements.

8. The system according to claim 7, wherein the data processing device is further configured to compare distance indicative measurements with signal strength indicative measurements in at least a subset of said plurality of locations.

9. The system according to claim 7, wherein the data processing device is further configured to identify discrepancies in apparent communicator locations based on said signal strength indicative measurements in at least a subset of said plurality of locations.

10. The system according to claim 7, wherein said indoor environment model represents radio-frequency signals transmitted from a plurality of transmitter locations and propagating through an indoor model including signal hindering elements.

* * * * *